United States Patent [19]

Vesterling

[11] 4,371,979
[45] Feb. 1, 1983

[54] METHOD AND APPARATUS FOR AFFORDING SELECTIVE ACCESS TO ADDITIONAL TELEVISION CHANNELS

[75] Inventor: Friedrich Vesterling, Blasdell, N.Y.

[73] Assignee: WNY Hospital Television, Inc., Buffalo, N.Y.

[21] Appl. No.: 270,147

[22] Filed: Jun. 3, 1981

[51] Int. Cl.³ .................... H04N 7/16; H04B 1/16; H04N 5/44
[52] U.S. Cl. ................................ 455/180; 358/84; 358/114; 358/194.1; 455/188
[58] Field of Search ............... 358/84, 86, 114, 115, 358/191.1, 194.1; 455/151, 153, 168, 176, 180, 181, 188, 3, 4, 171, 172

[56] References Cited

U.S. PATENT DOCUMENTS

| 4,012,583 | 3/1977 | Kramer | 358/84 |
| 4,183,057 | 1/1980 | Sonnenberg | 358/114 |
| 4,268,859 | 5/1981 | Ost | 358/84 |

*Primary Examiner*—Marc E. Bookbinder
*Attorney, Agent, or Firm*—Sommer & Sommer

[57] ABSTRACT

An improved device is operatively associated with a rentable television to enable a viewer to select access to rental channels in addition to free channels. To view the rental channels, the viewer need only depress the channel change selector switch for a minimum predetermined time interval. The fact that access to the rental channels has been provided, is visually indicated. In use, the device performs an improved method of affording selective access to the rental channels in addition to the free channels.

25 Claims, 8 Drawing Figures

METHOD AND APPARATUS FOR AFFORDING SELECTIVE ACCESS TO ADDITIONAL TELEVISION CHANNELS

BACKGROUND OF THE INVENTION

1. Field of the Invention

The present invention relates generally to the field of televisions, and more particularly to an improved device which may be associated with a rentable television to provide the viewer with immediate access to a first group of television channels, and selective access to a second group of additional television channels.

2. Description of the Prior Art

It is common today for a patient to rent a television during the period of his hospitalization. At least one rentable television is typically found in each patient's room. Usually, these are installed and maintained not by the hospital, but by an outside business. The patient is usually afforded immediate access to certain free channels, which may carry educational programming and the like, but is charged a rental fee to view certain additional channels. The rental channels may carry cable-supplied or locally-broadcast entertainment programming, for example. As used herein, the "first group" of channels is intended to refer to those channels to which the viewer is entitled to free access, and the "second group" is intended to refer to certain other channels, in addition to the free channels, to which the viewer may have access upon payment of a rental fee. The number and relative spacing of the channels in each group may be readily varied. For example, channels 3 and 6 might be the two free channels of the first group, and channels 4, 8, 9 and 11 might be the four rental channels of the second group.

In the hospital environment, the television is usually mounted in an overhead out-of-the-way location, and typically includes a remote hand-held control unit connected to the television by an umbilical cable. The hand-held unit may contain a volume control and a push-button channel selector switch. When the channel selector switch is closed, an appropriate channel change mechanism or switch causes the television to index sequentially through the channels. One channel may represent the "off" position of the television. Hence, to turn the television "on", the patient need only depress the channel selector switch to index through the various channels until the desired channel appears. To turn the television "off", the patient merely depresses the channel selector switch to index to the "off" channel.

Heretofore, such rental televisions have been typically provided with a key-operated switch which could be selectively operated by a hostess between at least three positions. The first position interrupted power to the television, the second provided access to the free channels only, and the third position afforded access to the rental channels as well as the free channels. However, a patient desiring to view the rental channels usually had to await arrival of the hostess before the key-operated switch could be moved to the third position.

Others have attempted to develop suitable systems for allowing the patient to select immediate access to the rental channels in the absence of the hostess. One example of such earlier effort is shown and described in Sonnenberg U.S. Pat. No. 4,183,057. Basically, Sonnenberg provides an override circuit capable of by-passing the key-operated switch when the patient simultaneously depresses two push-button switches. Sonnenberg's device also activated a visual indicator to alert the hostess that access to the rental channels had been obtained.

SUMMARY OF THE INVENTION

The present invention provides improved apparatus, associated with a television, to afford the viewer selective access to a second group of available channels in addition to a first group of available channels.

The improved device broadly includes: a mode switch, such as the key-operated switch, associated with the television and selectively movable between at least two positions, the first position thereof interrupting the supply of power to the television and the second position thereof permitting immediate access to the first channel group and selective access to the second channel group; a manually-operable selector switch, preferably the channel selector switch on the hand-held unit, movable between an open position and a closed position; and a control switch associated with the television and with the selector switch for affording selective access to the channels of the second group only when the mode switch is in its second position and the selector switch has been continuously closed for a predetermined time interval.

In use, the device performs the improved method of affording selective access to a second group of television channels in addition to a first channel group, which method broadly comprises the steps of: providing immediate access to the first channel group when the viewer turns on the television, requiring the viewer to continuously close a manually-operable selector switch for a predetermined time interval in order to select access to the second channel group; and controlling the operation of a control switch to afford access to the second channel group only after passage of the predetermined time interval.

Accordingly, the general object of the present invention is to provide an improved method and apparatus for affording a viewer immediate access to a first group of television channels, and selective access to an additional second group of television channels.

Another object is to provide an improved method and apparatus, associated with a rentable television, to permit the viewer to select access to the rental channels without requiring the presence of a hostess.

Still another object is to provide an improvement for a rentable television, which improvement utilizes and employs existing television controls, and is inexpensive to manufacture.

These and other objects and advantages will become apparent from the foregoing and ongoing specification, the drawings and the appended claims.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Figures 1, 2, 4, 5, 8:
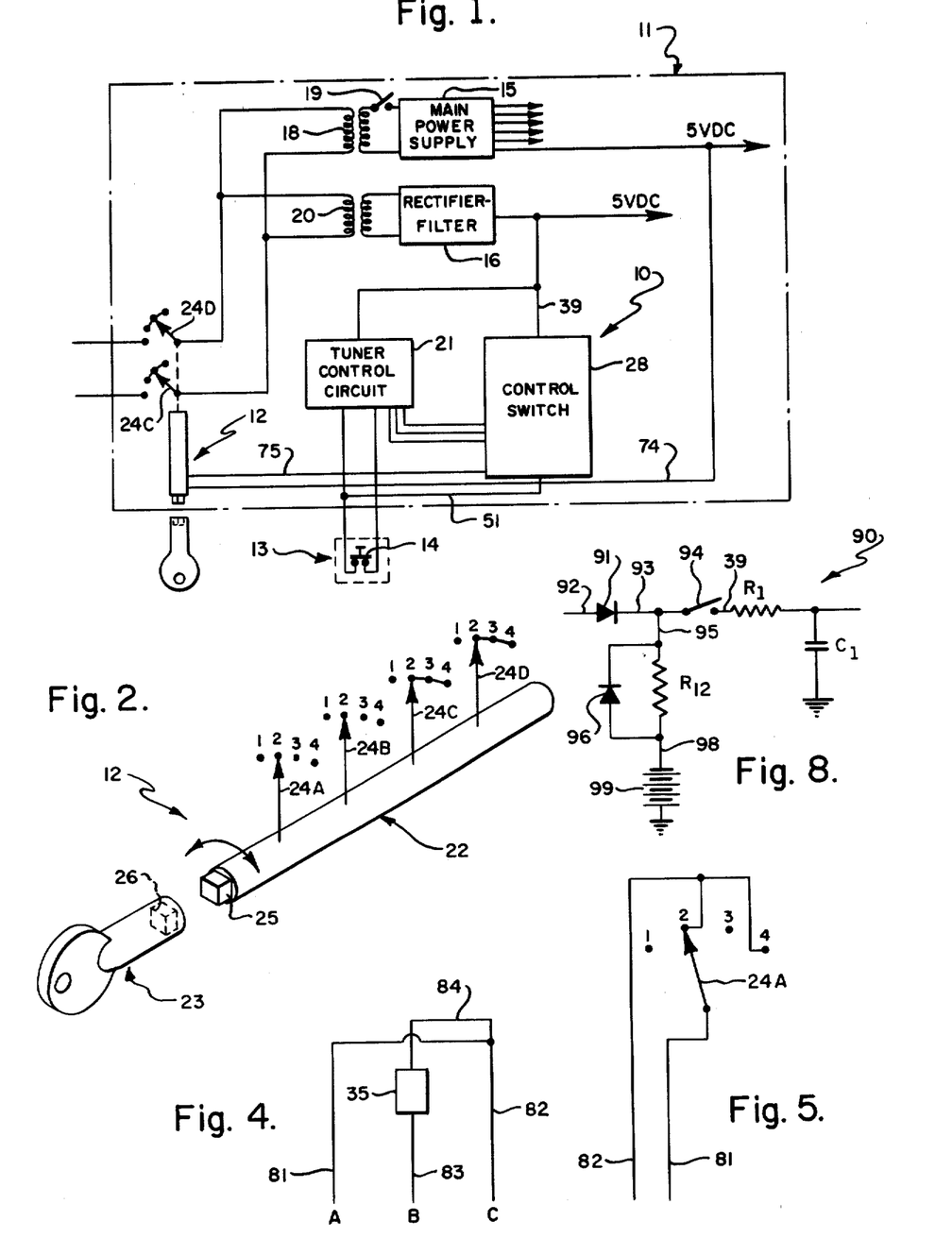
FIG. 1 is a block diagram schematically showing the improved device operatively associated with a rentable television.
FIG. 2 is a perspective schematic view of the key-operated mode switch, and depicting the four positions of same.
FIG. 4 is an electrical schematic of that portion of the control switch which is associated with the tuner control circuit.
FIG. 5 is an electrical schematic of the first wiper of the mode switch.
FIG. 8 is an electrical schematic of a modified portion of the control switch, which employs a trickle-charger to provide operational continuity despite interruption of commercial power.

Referring now to the drawings, and more particularly to FIG. 1 thereof, the invention broadly provides an improved device, of which the presently preferred embodiment is generally indicated at 10, which is adapted to be operatively associated with a monitor or television 11 for affording selective access to a second group of available channels in addition to a first groups of available channels. The disclosed embodiment is particularly suited for use with a rental television provided in hospital, although the invention is not limited to this or any other particular end use. For example, the improved device may be associated with a television provided in a hotel or motel room to afford a guest free access to locally-broadcast channels, but selective access to additional rental channels provided by cable. As used herein, the "first group" of channels is intended to refer to those channels to which a viewer is entitled to free access, and the "second group" is intended to refer to certain other channels, in addition to the free channels, to which the viewer may have selective access, usually upon payment of a rental fee. The number of such channels in each group may be readily varied. For example, channels 3 and 6 might be two free channels of the first group, and channels 4, 8, 9 and 11 might be four rental channels of the second group.

Television 11

In FIG. 1, the television 11 is shown as being of the commercial type specifically designed for rental use. This television is typically provided with a key-operated mode switch 12, and has a remote cable-connected hand-held unit 13 which contains certain controls, such as a volume level control (not shown) and a channel selector switch, schematically indicated by push button 14. A suitable motor or switching mechanism (not shown) is operated when the viewer depresses channel selector 14 to index sequentially through the various television channels. One channel may act as the "off" switch for the television. Thus, to turn the television "off", the viewer need only depress push button 14 until the mechanism indexes to the desired channel to which accesss has been provided.

The television 11 is shown as further including main power supply unit 15 capable of producing a number of voltage outputs (as indicated by the arrows), one of which is 5 volts DC; and a rectifier-filter 16, also producing a 5 volt DC output. Thus, power is supplied through mode switch 12 to a main transformer 18, and thence through an on-off switch 19 to main power supply unit 15. Such power is also supplied through a second transformer 20, arranged in parallel with transformer 18, to rectifier-filter 16. The television also includes a tuner control circuit 21, which includes a microprocessor and channel change mechanism. This much of the television is part of the prior art.

In FIG. 2, key-operated mode switch 12 has been depicted somewhat schematically to illustrate its intended operation. This structure is shown as including a switch portion 22 and a removable key 23. The switch portion has an elongated rotatable shaft from which four axially-spaced wiper arms 24A–D extend radially upwardly so as to be arranged in a common plane. The foreground end of the shaft is provided with a square head 25, which is adapted to be received in a complementarily-configured socket 26 of the key. This head and socket coupling is intended to be schematic for illustrative purposes only. Thus, a hostess may couple the key to the shaft, and thereafter selectively rotate the shaft so that each of the wipers contacts any of four discrete electrical positions, severally labelled "1", "2", "3" and "4". Wipers 24C and 24D are operatively arranged in the main power supply line (FIG. 1). Position "1" represents an "off" position at which the main power supply to the television is interrupted. Terminals "2", "3" and "4", contacted by wipers 24C and 24D, are electrically connected together by appropriate buses. Hence, when wipers 24C and 24D are in position "1", power to the television is interrupted; when these wipers are in positions "2", "3" or "4", power is provided to the television.

The Improved Device 10

As schematically indicated in FIG. 1, the improved device 10 may be mounted in or on the television as desired. The improved device is adapted to be supplied with 5 VDC power from the output rectifier-filter 16; supplied with 5 VDC power from main power supply 15; is connected to the control cable leading to the hand-held unit 13; and is operatively coupled to the tuner control circuit 21.

Figure 3:
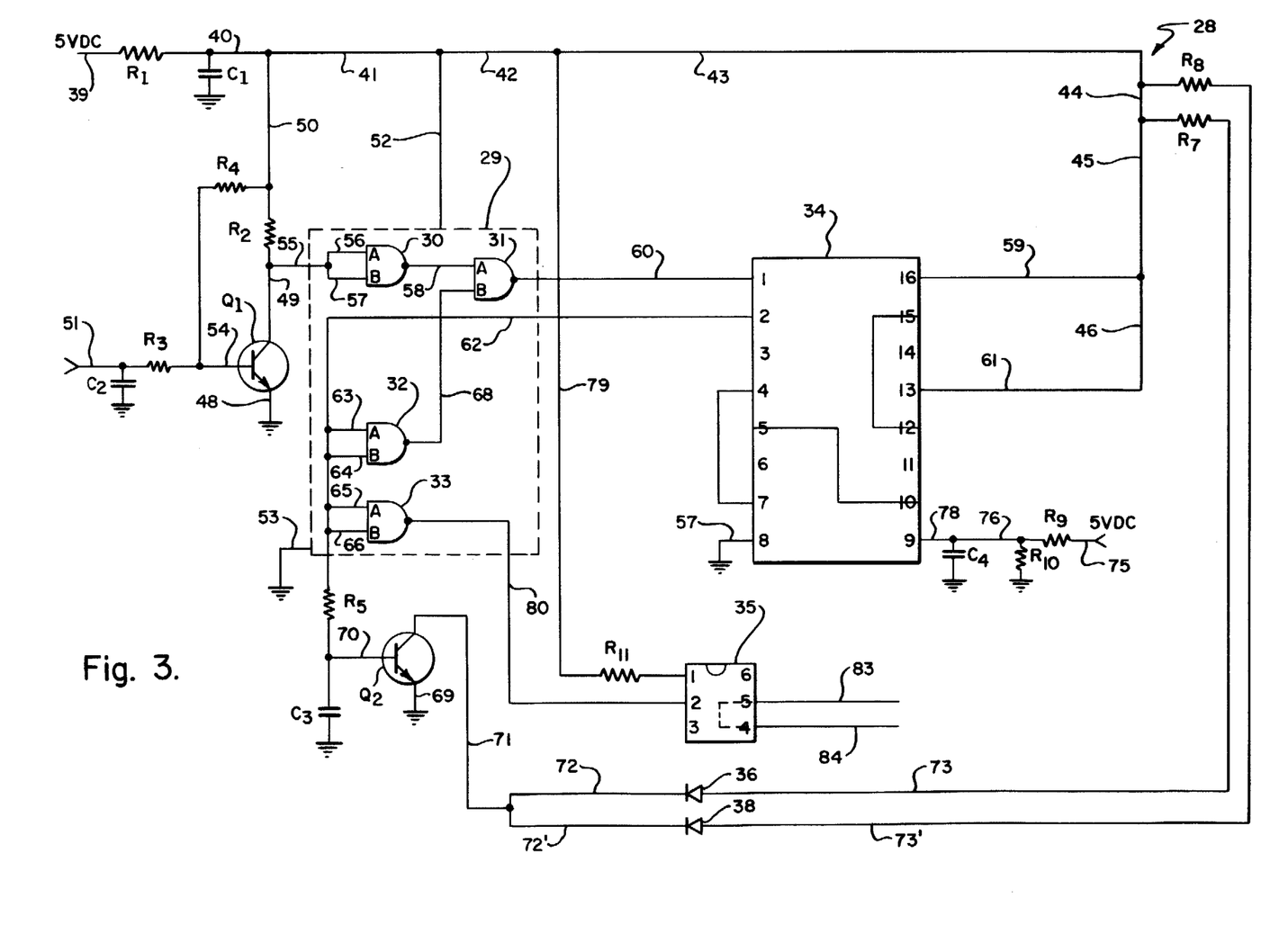
FIG. 3 is an electrical schematic of the control switch.

Referring now to FIGS. 1–3, the improved device 10 broadly includes a mode switch, such as key switch 12, associated with the television and selectively movable between at least two positions (i.e., positions "1" and "2"), the first position thereof interrupting the supply of power to the television and the second position thereof permitting immediate access to the first channel group and selective access to the second channel group; a manually-operable selector switch, such as channel selector 14, movable between an open position and a closed position; and a control switch 28 associated with the television and with the selector switch for affording access to the second channel group only when the mode switch is in the second position and the selector switch has been continuously closed for a predetermined time interval.

Referring now to FIG. 3, the control switch 28 is shown as including an integrated circuit 29 having four NAND gates 30, 31, 32, 33; transistor switches $Q_1$ and $Q_2$; a type-D flip-flop 34 used as a counter; an opto-coupler 35; and two light-emitting diodes (LED) 36 and 38.

When key switch 12 is in positions "2", "3" or "4", power will be supplied via transformer 20 to rectifier-filter 16, which produces a 5 VDC output. This 5 VDC output is supplied to the control switch or circuit 28 via conductor 39, and passes through an RC filter, including resistor $R_1$ and capacitor $C_1$. The output of the RC filter will be substantially a 5 VDC signal appearing in series-connected conductors 40–46.

Transistor switch $Q_1$ has its emitter connected to ground via conductor 48; has its collector terminal connected to conductor 40 via conductor 49, current limiting resistor $R_2$ and conductor 50; and has its base arranged to receive an appropriate signal from the selector switch 14 via conductor 51, a bias resistor $R_3$ and conductor 54. Another bias resistor $R_4$ is connected between conductor 50 and resistor $R_2$, and between resistor $R_3$ and conductor 54. A grounded capacitor $C_2$ is connected between conductor 51 and bias resistor $R_3$.

Power from conductor 41 is supplied via conductor 52 to integrated circuit 29, which is grounded via conductor 53. Such supply to the integrated circuit powers the four NAND gates 30–33, the operation of which will be described infra. The voltage appearing in conductor 49 is supplied via conductors 55, 56 and 57 to input terminals A and B of NAND gate 30, the output terminal of which is connected via conductor 58 to input terminal A of NAND gate 31.

The flip-flop 34 is used as a species of shift register, is indicated as having sixteen numbered terminals, and is used as a counter. Power in conductor 45 is supplied via conductor 59 to input terminal "16" of flip-flop 34. Terminal "8" thereof is grounded via conductor 57. Terminal "1" thereof is a reset, and receives the output of NAND gate 31 via conductor 60. Flip-flop 34 is employed as a counter. In the preferred embodiment, the flip-flop 34 is arranged to sense the application of sequential unit pulses upon its input terminal "9", and to provide a 5 VDC output signal at its output terminal "2" only when four of such unit pulses have been impressed on its input terminal "9". In effect, application of each unit pulse will shift the 5 VDC voltage to a different flip-flop terminal. Before application of the first unit pulse, the 5 VDC input is supplied to input "13" via conductor 61. After the first unit pulse is applied to terminal "9", a 5 VDC signal will appear at terminal "15" only; after the second sequential pulse has been applied, a 5 VDC signal will appear at terminal "15" and at terminal "10"; after the third sequential pulse has been applied, a 5 VDC output signal will appear at terminals "15", "10" and at terminal "7"; and, finally, after the fourth sequential pulse has been applied, a 5 VDC output signal will appear at terminals "15", "10", "7" and at output terminal "2". Thus, from a functional point of view, a 5 VDC output signal will appear at terminal "2" only after four unit pulses have been sequentially applied to terminal "9", without the intervention of a reset interruption. The signal appearing at flip-flop terminal "2" is supplied via conductor 62 to the input terminals A and B of NAND gate 32 via conductors 63, 64, and to the input terminals A and B of NAND gate 33 via conductors 65 and 66. The output of NAND gate 32 is supplied via conductor 68 to input terminal B of NAND gate 31. Conductor 62 is also connected to ground through a current limiting resistor $R_5$ and a flitering capacitor $C_3$.

Transistor $Q_2$ has its emitter terminal connected to ground via conductor 69, has its base terminal connected to conductor 62 between resistor $R_5$ and capacitor $C_3$ via conductor 70, and has its collector terminal connected via conductor 71 to the indicating circuit. The indicating circuit includes two light-emitting diodes (LED) arranged in parallel. The first parallel branch includes (in series) conductor 72 connected to conductor 71, LED 36, conductor 73 and resistor $R_7$ connected to conductor 44. The second parallel branch includes (in series) conductor 72' connected to conductor 71, LED 38, conductor 73', and resistor $R_8$. These two parallel branches are provided so that an indicating LED can be located on each side of the television, as desired.

The 5 VDC signal from the main power supply 15 is supplied via conductor 74 to mode switch wiper 24A, the position of which may be selectively adjusted between any of positions "1", "2", "3" or "4" (FIG. 2), and thence via conductor 75 to a voltage divider and filter to terminal "9" of flip-flop 34. The voltage divider includes a resistor $R_9$ arranged in series between conductor 75 and conductors 76 and 78, and a grounded resistor $R_{10}$ connected between resistor $R_9$ and conductor 76. The filter is shown as including a grounded capacitor $C_4$ connected between conductor 76 and 78.

As previously noted, the tuner control circuit 21 includes known means for sequentially indexing through each of the channels, either mechanically or electrically, so long as the viewer holds channel selector switch 14 closed. However, one of the channels represents the "off" position of the television. As long as the viewer holds channel selector button 14 depressed, one or more unit pulses will be present in conductor 75. The length of each unit pulse will be determined by the length of time that the viewer depresses button 14, or until the channel change mechanism articulates through the channel representing the "off" position. Assume that there are a total of twelve channel positions, (i.e., channels 2–13), but that, say, channel 13 represents the "off" position. If the viewer desires to change from, say, channel 2 to, say, channel 4, he simply depresses channel selector switch 14 until channel 4 appears on the television screen. In this illustration, a single unit pulse will appear in conductor 75 when button 14 is depressed. The width of this unit pulse will represent the time needed to articulate from channel 2 to channel 4. If the channel change mechanism articulates at a rate of, say, one channel per second, the width of this unit pulse will be two seconds.

In the preferred embodiment, to select access to the second channel group, the viewer must continuously hold the channel selector switch closed to enable the channel change mechanism to index through all available channels for a length of time sufficient to generate at least four unit pulses in conductor 75. Thus, if the set is initially "off" (i.e., channel 13), the viewer may select to view the channels of the second channel group by continuously depressing the channel selector switch for thirty-seven seconds. This will produce in conductor 75 four sequential unit pulses, each of a eleven second length (i.e., channels 2–12), separated by one second intervals (i.e., channel 13). In the preferred embodiment, access to the second channel group is afforded by the sensing of four sequential unit pulses without intervening reset, and not by the length of the pulses. Thus, if the television is initially on channel "12", for example, the first unit pulse may be of only one second length.

Power is supplied from conductor 42 via conductor 79 and current limiting visitor $R_{11}$ to input terminal "1"

of opto-coupler 35. Terminal "2" thereof is connected via conductor 80 to the output NAND gate 33.

Referring now to FIG. 1, three lines are depicted as leading from the device 10 to the tuner control circuit. In FIG. 4, these three lines are denominated "A", "B" and "C". Terminals "A" and "C" are always connected via conductors 81 and 82. Terminal "B" is connected to terminal "C" via conductor 83, opto-coupler 35, and conductor 84 connected to the node between conductors 81 and 82. The opto-coupler is normally open, so as to interrupt conductors 83 and 84. However, when current flows to the opto-coupler through conductor 79 (FIG. 3), the opto-coupler will be closed so as to electrically connect conductors 83 and 84. When the opto-coupler is open, terminals "A" and "C" will be connected. This represents access to the first channel group. When the opto-coupler is closed, terminals "A", "B" and "C" will be connected, and this permits access to the second channel group in addition to the first channel group.

Operation

Assume that the mode switch is in position "1". In this condition, power to the television is interrupted, and the would-be viewer cannot turn on the set.

To permit operation of the television, the hostess inserts key 23 and rotates the mode switch to position "2". This will afford the viewer immediate access to the various channels of the first channel group, and the capability of selective access to those additional channels of the second channel group. Assume that the television is initially in "off" channel 13. In this condition, power is supplied to rectifier-filter 16, which provides a 5 VDC output to the device 10. However, power to the main power supply 15 will be interrupted because channel 13 is the "off" position. Hence, there will be no initial 5 VDC signal. In this condition, a signal of 0.6 volts from the hand-held unit will be supplied via conductor 51 to keep switch $Q_1$ closed, thereby dumping the 5 VDC voltage in conductor 50 through resistor $R_2$. Since a zero voltage will appear at both inlet terminals of NAND gate 30, the output thereof will be 5 VDC, which in turn is supplied to inlet terminal A of NAND gate 31. Initially, a zero voltage appears in conductor 62, and at both inlet terminals of NAND gates 32 and 33. Hence, NAND gate 32 will supply a 5 VDC output to inlet terminal B of NAND gate 31, and NAND gate 33 will supply a 5 VDC output to opto-coupler terminal "2". Since 5 VDC signals appear at the inlets of NAND gate 31, the output thereof will be a 0 VDC signal supplied to flip-flop reset terminal 1. Switch $Q_2$ will remain open and LED's 36 and 38 will not be illuminated.

Figure 6:
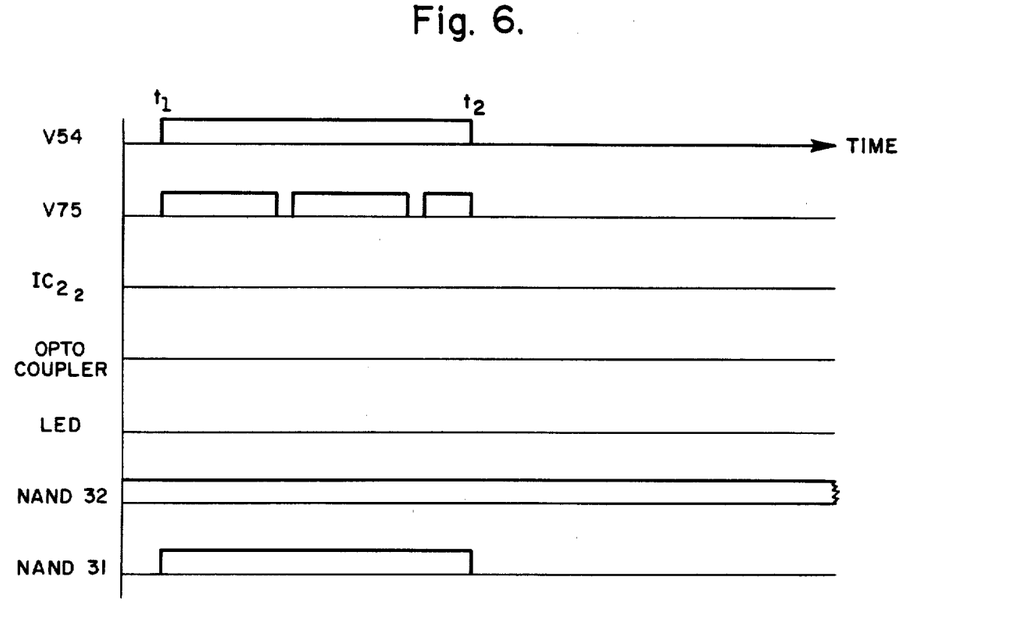
FIG. 6 depicts the signals appearing in various conductors as a function of time, when the selector switch is continuously depressed from $t_1$ to $t_2$ to supply three sequential unit pulses to the control switch.
Figure 7:
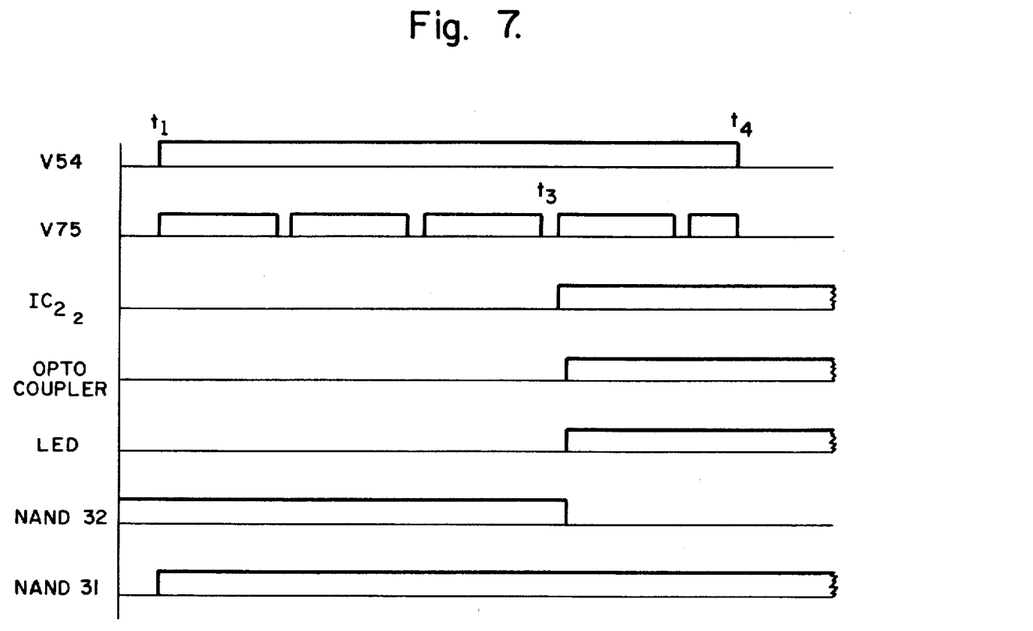
FIG. 7 depicts the signals appearing in various conductors as a function of time when the selector switch is continuously depressed from $t_1$ to $t_4$ to supply five sequential unit pulses to the control switch.

From a functional viewpoint, the operation of the device may be clearly understood from a comparison of FIGS. 6 and 7 in connection with FIG. 3. As previously noted, access to the second channel group is afforded by the viewer selectively depressing push button 14 for a length of time sufficient to deliver four sequential unit pulses, without interruption, to the device via conductor 75. The actual length of time needed to do this will depend upon the initial position of the channel change mechanism, i.e., whether on channel "2" or "12" or "13".

Referring now to FIG. 3, assume that the mode switch is initially in position "2" and that the television is on "off" channel 13. In effect, the television is in condition to be operated when the viewer subsequently depresses channel selector 14. In this initial condition, conductor 51 carries a signal of 0.6 VDC which holds switch $Q_1$ in a closed condition. Both inlets of NAND gate 30 see ground through closed switch $Q_1$, and NAND gate 30 produces a 5 VDC output which is supplied via conductor 58 to inlet A of NAND gate 31. The inlets of NAND gates 32 and 33 see a zero output from flip-flop terminal 2, and both NAND gates produce a 5 VDC output. Since NAND gate 31 sees a 5 VDC from NAND gate 30 at inlet A, and a 5 VDC signal from NAND gate 32 at terminal B, the output of NAND gate 31 will be zero, which is supplied to flip-flop reset terminal "1" via conductor 60. The initial 5 VDC output from NAND gate 33 is supplied via conductor 80 to the opto-coupler, and opposes the 5 VDC signal in conductor 79. Thus no current flows through the opto-coupler, and opto-coupler output conductors 83 and 84 remain interrupted. The zero voltage in conductor 62 holds switch $Q_2$ open, and LED's 36 and 38 are not illuminated.

Referring now to FIG. 6, assume now that the viewer depresses channel selector switch at time $t_1$, and continuously holds switch 14 in such depressed condition until the channel selector sequentially indexes through all the channels (i.e., channels 2–13) for two and one-half times.

When the viewer depresses channel selector switch 14, the signal in conductor 51 drops from 0.6 VDC to zero, thereby opening switch $Q_1$. Now, both inlets of NAND gate 30 will see a 5 VDC signal supplied via conductor 55, and the output of NAND gate 30 will drop from 5 VDC to zero. Thus, when button 14 is depressed, inlet A of NAND gate 31 will see zero, but inlet B thereof will continue to see the 5 VDC output of NAND gate 32. Since both inlets of NAND gate 31 do not see the same 5 VDC voltage, the output thereof will change to, and this output will be continuously supplied to flip-flop reset terminal "1" via conductor 60. No voltage will appear at flip-flop output terminal "2" unless and until four sequential unit pulses have been received without interruption at flip-flop control terminal "9". If the viewer holds push button 14 depressed for a time sufficient for the channel selector mechanism to sequentially index through channels 2–13 two and one-half times, only three sequential unit pulses will be supplied via conductor 75 to flip-flop control terminal "9". Thus, flip-flop output terminal "2" will remain at zero, NAND gates 32 and 33 will continuously produce 5 VDC outputs, and switch $Q_2$ will remain open. Thus, the indicator LED's will not be illuminated if only three sequential pulses are applied to flip-flop control terminal "9".

When the viewer releases button 14 at $t_2$ after three sequential pulses have been produced, a 0.6 VDC signal will again appear in conductor 51, thereby closing switch $Q_1$. Both inlet terminals of NAND gate 30 will see ground, and the output thereof will go from zero to 5 VDC. When this happens, both inlets of NAND gate 31 will see 5 VDC inputs, but the output thereof will drop to zero, thereby erasing any memory that three sequential pulses have been applied.

The device will operate in basically the same manner if less than three pulses are supplied.

FIG. 7 depicts the operation of the device when four or more sequential unit pulses are supplied. In this illustration, it is assumed that the viewer depresses button 14 at time $t_1$, and holds it depressed until time $t_4$. In the illustration, the time of depression (i.e., from $t_1$ to $t_4$) is sufficient to cause the channel change mechanism to sequentially index through all available channels for about four and one-half times. This will cause five sequential pulses to be delivered to flip-flop control terminal "9". As indicated in FIG. 7, if the set is initially on "off" channel 13, the first four pulses will be of equal width, each representing the time needed for the channel change mechanism to articulate through channels 2–12. The fifth pulse is shown as being about half the width of the first four channels, only because it is assumed that the viewer has released button 14 so as to view channel 7. Each adjacent unit pulse is separated by the time needed for the channel change mechanism to articulate through "off" channel 13.

Initially, the various system components are in the condition described above. From time $t_1$ until just before time $t_3$, when the fourth sequential pulse has been applied, the device operates as described above.

However, when the fourth sequential pulse has been applied at time $t_3$, a 5 VDC signal will appear at flip-flop output terminal "2", and be delivered via conductor 62 to both inlets of each of NAND gates 32 and 33, and to switch $Q_2$. Since NAND gate 32 will see 5 VDC at each of its inlets, the output thereof will drop to zero. Thus, so long as button 14 remains depressed, NAND gate 31 will see zero at inlet A and zero at inlet B, and the output thereof will remain at 5 VDC and be supplied to flip-flop reset terminal "1" to hold and retain the memory of four sequential pulses having been applied. At the same time, the output of NAND gate 33 will drop to zero, allowing current to flow through the opto-coupler and electrically connecting conductors 83 and 84. At the same time, switch $Q_2$, closes to allow current to flow through conductor 71, thereby illuminating LED's 36 and 38.

Thereafter, at time $t_4$, the viewer releases button 14. When this happens, the 0.6 VDC signal again appears in conductor 51, thereby closing switch $Q_1$. Since both inlets of NAND gate 30 will see zero through closed switch $Q_1$, the output thereof will rise to 5 VDC signal, and be supplied to inlet terminal of NAND gate 31. However, since inlet terminal B of NAND gate 31 is zero, the output thereof will remain at 5 VDC so as to retain the memory of four sequential pulses having been applied. Thus, a 5 VDC signal will remain at outlet terminal "2" of the flip-flop, even after the viewer has released the push button. The retained signal holds the opto-coupler closed, thereby affording continued access to the additional channels of the second group; and holds switch $Q_2$ closed, thereby continuing the illumination of LED's 36 and 38. Thus, once access to the second channel group has been obtained, the device cannot be reset through the viewer's manipulation of channel selector switch 14. Thus, LED's 36 and 38 will remain illuminated, thereby indicating to the hostess that the viewer has elected to receive the channels of the second group in addition to those of the first group.

Once access to the second channel group has been obtained, the hostess may reset the device by inserting key 23 and moving mode switch 12 from position "2" to position "1", and then back to position "2". Such movement to position "1" deenergizes the television and the device such that the voltage at flip-flop terminal "2" will fall to zero. When reset back to position "2", the television and the device will again be in a condition so as to afford immediate access to the first channel group and selective access to the additional channels of the second group.

In the preferred embodiment herein disclosed, the mode switch 12 may be alternatively rotated to position "3" (FIG. 5), which will afford the viewer access to the first channel group, but which will deny access to the second channel group regardless of the viewer's manipulation of the push button 14.

The key-operated switch provided on many televisions intended for rental use, may have a fourth position indicated as position "4" in FIGS. 2 and 5. With the improved device, only positions "1" and "2" are needed, with position "3" affording an optional capability of being able to lock out access to the second channel group. With the preferred embodiment of device 10, mode switch position "4" is unnecessary, and is coupled with conductor to position "2". Thus, in the illustrated embodiment, the device will operate the same regardless of whether mode switch 12 is in position "2" or position "4". If desired, however, position "4" might be used for some other purpose.

Optional Trickle-Charger (FIG. 8)

One disadvantage inherent in the basic device shown in FIGS. 1–7 and previously described, is that the device may be reset, either intentionally or unintentionally, by an interruption in the power supplied to the television. For example, if one were to momentarily unplug the television, this would have the same resetting effect as the hostess moving the key switch from position "2" to position "1", and then back to position "2". Also, a temporary power failure would have a similar effect. In either case, an interruption in the supplied power would reset the flip-flop and cancel the memory that access to the second channel group had been selected.

The foregoing disadvantage may be easily overcome by providing an optional trickle-charging circuit, generally indicated at 90, as shown in FIG. 8. This tricklecharging circuit 90 has the effect of preventing a cancellation of the flip-flop's memory despite an interruption in the commercially-supplied power.

Referring now to FIG. 8, the trickle-charging circuit 90 may be positioned in conductor 39, ahead of the RC filter including capacitor $C_1$ and resistor $R_1$. The trickle-charging circuit 90 is shown as including a diode 91 arranged in series between power supply conductor 92 and a conductor 93 communicating with conductor 39 through switch 94; and a branch circuit including a conductor 95 connected to conductor 93, a resistor $R_{12}$ arranged in parallel with another diode 96, and a conductor 98 connected to a battery 99, one terminal of which is grounded. Persons skilled in this art will appreciate that diodes 91 and 96 act like one-way check valves in the hydraulic analog. Thus, when switch 94 is closed, commercial power may be supplied through conductor 92 and diode 91. This will power the control switch 28 via conductor 39 (FIGS. 3 and 8). At the same time, such supplied power will continuously charge battery 99 through resistor $R_{12}$. Hence, the control switch 28 will operate as previously described.

If there should be an interruption in the commercial power supplied through conductor 92, for some reason, battery 99 will supply power to the control switch 28 through diode 96, this being the path of least resistance. Thus, when commercial power is supplied through conductor 92, battery 99 is placed in a continuously charged stand-by condition. If such commercial power is interrupted, battery 99 will supply power to the control switch to prevent reset of the flip-flop. During the period of such power interruption, the television will be disabled, but the trickle-charging circuit 90 will effectively retain the memory that access to the second channel group has been selected. In the preferred embodiment, switch 94 (FIG. 8) may be wiper 24A or 24B of the key switch 12, so as to afford the capability of permitting the hostess to manually reset the improved device. As previously noted, the switch 94 is arranged downstream of the commercially-supplied power and the trickle-charging circuit. cl Modifications The present invention contemplates that many modifications and changes may be made. The particular type of the various circuit components is not deemed critical, and fungible components affording like features may be readily substituted for those specifically shown. Thus, for example, other forms of remote relays may be substituted for the opto-coupler, and other forms of indicating devices may be substituted for the LED's. While the indicators are shown as being mounted directly on the television, they may be positioned in remote locations, as well. Other forms of counters or devices having a time delay feature may be substituted for the flip-flop, and these may be selected or adjusted so as to afford access to the second channel group upon receipt of a greater or lesser number of unit pulses. For example, a shift register could be substituted for the flip-flop. Other means and devices capable of generating unit pulses may be substituted, although use of the channel selector switch is presently preferred for reasons of economy and simplicity. The hand-held unit need not necessarily be umbically connected to the television. Indeed, in some contemplated applications, a remote control unit may not be necessary at all, and the viewer may directly manipulate the normal channel selector switch on the television itself.

As used herein and in the appended claims, the "predetermined time interval" refers to that length of time during which the selector switch must be continuously closed to afford access to the second channel group. In the preferred embodiment, the "predetermined time interval" refers to that length of time needed to generate four sequential unit pulses, although this number is not critical and may be changed. The specific length of time needed to do this will depend on the starting and stopping channels, and the number of intervening channels through which the channel change mechanism must index. In the disclosed embodiment, with channel 13 being the television "off" position, the minimum time interval will be the length of time needed to index through at least twenty-six channel positions, thus assuming that the television was initially on channel 12, indexed sequentially through all available channels twice, and stopped on channel 2. If the television was started from a channel other than channel 12, and stopped on a channel other than channel 2, a greater amount of time would be required. If the television was initially on "off" channel 13, the channel change mechanism might have to index sequentially through about thirty-seven channels before four unit pulses would be supplied. Persons skilled in this art will readily appreciate that the length of this "predetermined time interval" may be readily varied, for example, by altering the number of channels through which the channel change mechanism must sequentially index, or by other means. While the disclosed embodiment employs a type-D flip-flop as a counter, so as to delay the production of an output signal at terminal "2" thereof until four unit pulses have been sequentially applied impressed upon input terminal "9" thereof, other forms of counters, shift registers, and components having a time delay capability may be readily substituted. Thus, the feature of affording selective access to the second channel group stems from the requirement that the viewer must hold the selector switch continuously closed for a deliberately long, and somewhat uncommon, time interval. This requires a purposeful act by the viewer, and obviates the viewer's possible claim that such access was unwittingly and accidentially gained. The principle advantage of the disclosed control switch is that it makes optimum use of features and capabilities provided by rentable televisions which are commercially available. Hence, the need to provide additional elements and components, the features of which would be unnecessarily redundant, with features available in the television itself, is minimized, with concomitant advantage that the cost of manufacturing the device is also kept to a practical minimum.

Therefore, while the presently preferred embodiment has been shown and explicitly described, and several contemplated modifications thereof discussed, persons skilled in this art will readily appreciate that various additional changes and modifications may be made without departing from the spirit of the invention, which is defined solely by the scope of the following claims.

What is claimed is:

1. A device coupled with a television tuner control circuit for affording selective access to a second group of available channels in addition to a first group of available channels, comprising:
    a mode switch selectively movable between at least two positions, the first position thereof interrupting a supply of power and the second position thereof permitting immediate access to said first channel group and selective access to said second channel group;
    a manually-operable selector switch movable between an open position and a closed position; and
    a control switch circuit coupled with said tuner control circuit and with said selector switch for affording selective access to said second channel group only when said mode switch is in said second position and said selector switch has been continuously in its closed position for a predetermined time interval.

2. A device as set forth in claim 1 and further comprising an indicator for indicating that said device has been operated to afford access to said second channel group.

3. A device as set forth in claim 2 wherein said indicator will continuously indicate that said device has been operated to afford access to said second channel group until said device is reset.

4. A device as set forth in claim 1 wherein said device is reset by selectively moving said mode switch from said second position to said first position.

5. A device as set forth in claim 2 wherein said indicator will display a visual signal.

6. A device as set forth in claim 1 wherein said mode switch may be selectively moved to a third position, said third position affording access to only said first channel group but not to said second channel group.

7. A device as set forth in claim 1 wherein said mode switch is mounted on said television and may be selectively moved between said first and second positions of a removable key.

8. A device as set forth in claim 1 wherein said selector switch is a channel selector switch of said television.

9. A device as set forth in claim 1 wherein said television includes a remote control unit and wherein said selector switch is a channel selector switch of said television as part of said remote control unit.

10. A device as set forth in claim 1 wherein said control switch circuit includes a delay element operative to provide an output signal only after said selector switch has been closed for said predetermined time interval.

11. A device as set forth in claim 10 and further comprising a sensing circuit operative to sense the existence of said delay element output signal.

12. A device as set forth in claim 11 and further comprising an indicator controlled by said sensing circuit for continuously indicating that said delay element output signal has been sensed independently of subsequent operation of said television.

13. A device as set forth in claim 12 and further comprising a relay switch controlled by said sensing circuit and operable to afford access to said second channel group when said delay element output signal has been sensed.

14. A device as set forth in claim 13 wherein said relay switch includes an opto-coupler.

15. A device as set forth in claim 10 wherein said delay element includes a type-D flip-flop.

16. A device as set forth in claim 15 wherein when said selector switch is closed for said predetermined time interval, a series of sequential unit pulses will be supplied as an input to said flip-flop.

17. A device as set forth in claim 16 wherein the width of each separate pulse represents the time needed for the television channel selector to index through the first channel group.

18. A device as set forth in claim 17 wherein the space between successive pulses represents the time during which the television is in an "off" condition.

19. A device as set forth in claim 11 wherein said sensing circuit includes at least one NAND gate.

20. A device as set forth in claim 1 and further comprising: a charge circuit operative to supply power to said control switch circuit from an auxiliary power source whenever commercial power to said television is interrupted.

21. The method of affording selective access to a second group of available channels of a television in addition to a first group of available channels of said television, comprising the steps of:
providing immediate access to said first channel group when the viewer turns on said television;
continuously holding closed a manually-operable selector switch for a predetermined time interval in order to select access to the second channel group; and
controlling the operation of a control switch circuit to afford access to said second channel group after passage of said predetermined time interval.

22. The method as set forth in claim 21, comprising the further step of:
actuating an indicator when said control switch circuit has been controlled.

23. The method as set forth in claim 21, comprising the further step of:
maintaining said control switch circuit in such controlled condition once selected.

24. The method as set forth in claim 22 comprising the further step of:
manually resetting said indicator.

25. The method as set forth in claim 21 comprising the further step of:
supplying power from an auxiliary source whenever commercial power to said television is interrupted.

* * * * *